(12) United States Patent
Measom et al.

(10) Patent No.: US 11,067,284 B2
(45) Date of Patent: Jul. 20, 2021

(54) PELLET FUELED GRILL WITH CLEANOUT PORT

(71) Applicant: Logan Outdoor Products, LLC, Hyde Park, UT (US)

(72) Inventors: S. Ty Measom, Hyde Park, UT (US); Brett Bennett, Mantua, UT (US)

(73) Assignee: Logan Outdoor Products, LLC, Hyde Park, UT (US)

( * ) Notice: Subject to any disclaimer, the term of this patent is extended or adjusted under 35 U.S.C. 154(b) by 43 days.

(21) Appl. No.: 16/438,768

(22) Filed: Jun. 12, 2019

(65) Prior Publication Data

US 2019/0293296 A1 Sep. 26, 2019

Related U.S. Application Data

(63) Continuation of application No. 15/491,776, filed on Apr. 19, 2017, now Pat. No. 10,330,322, which is a continuation of application No. 14/329,678, filed on Jul. 11, 2014, now Pat. No. 9,635,978, which is a continuation-in-part of application No. 13/345,420, filed on Jan. 6, 2012, now abandoned.

(51) Int. Cl.
  *F24B 13/00* (2006.01)
  *A47J 37/07* (2006.01)

(52) U.S. Cl.
  CPC ............. *F24B 13/006* (2013.01); *A47J 37/07* (2013.01); *A47J 37/0704* (2013.01); *A47J 37/0786* (2013.01); *Y10S 16/03* (2013.01); *Y10S 16/24* (2013.01); *Y10S 16/25* (2013.01); *Y10S 16/30* (2013.01); *Y10S 16/32* (2013.01)

(58) Field of Classification Search
  CPC ...... F24B 13/006; A47J 37/0704; A47J 37/07; A47J 37/0786; Y10S 16/32; Y10S 16/24; Y10S 16/25; Y10S 16/30; Y10S 16/03; E05B 13/002; E05B 13/004
  See application file for complete search history.

(56) References Cited

U.S. PATENT DOCUMENTS

| | | |
|---|---|---|
| 1,011,777 A | 3/1870 | Stevenson |
| 121,667 A | 12/1871 | Schuyler |
| 2,745,397 A | 5/1956 | Levin |
| 3,126,881 A | 3/1964 | Blotsky |
| 3,209,743 A | 10/1965 | Stewart |
| 3,369,482 A | 2/1968 | Kahn |
| 3,667,448 A | 6/1972 | Dorian |

(Continued)

*Primary Examiner* — Alfred Basichas
(74) *Attorney, Agent, or Firm* — Amardeep S. Grewal; Gerard M. Donovan; Reed Smith LLP

(57) ABSTRACT

A cooking grill with a cooking chamber, pellet fuel combustion unit, and ash cleanout system for releasing retained ash from the combustion unit through an access door without requiring the disassembly of the upper components of the grill. The combustion unit has a first end with a first end opening, and a second end with a second end opening. The ash cleanout system includes an access door adjacent to the second end, operable by a user from a position external to the cooking chamber through a pull link, and capable of a first position wherein the second end opening is closed to generally retain ash within the pellet fuel combustion unit, and a second position wherein the second end opening is open to release the retained ash to a separate removal location.

17 Claims, 5 Drawing Sheets

(56) References Cited

U.S. PATENT DOCUMENTS

| | | |
|---|---|---|
| 4,436,081 A | 3/1984 | Hefling |
| 4,454,827 A | 6/1984 | Smith |
| 4,624,239 A | 11/1986 | Yellin |
| 4,823,684 A | 4/1989 | Traeger |
| 4,895,134 A | 1/1990 | Fielding |
| 4,957,039 A | 9/1990 | Reyes |
| 5,584,098 A | 12/1996 | Koyama |
| 5,638,807 A | 6/1997 | Flamenbaum |
| 5,865,099 A | 2/1999 | Waugh |
| 5,983,885 A | 11/1999 | Jarvi |
| 6,155,248 A | 12/2000 | Schlosser |
| 6,223,737 B1 | 5/2001 | Buckner |
| 6,318,356 B1 | 11/2001 | Stephen |
| 6,830,000 B2 | 12/2004 | Mendive |
| 7,900,553 B1 | 3/2011 | Maurin |
| 2003/0150336 A1 | 8/2003 | Roescher |
| 2003/0217647 A1 | 11/2003 | Jones |
| 2007/0137634 A1 | 6/2007 | Traeger |
| 2011/0271949 A1 | 11/2011 | Ortner |
| 2013/0206015 A1* | 8/2013 | Jacoby .................... A47J 37/07 99/330 |

* cited by examiner

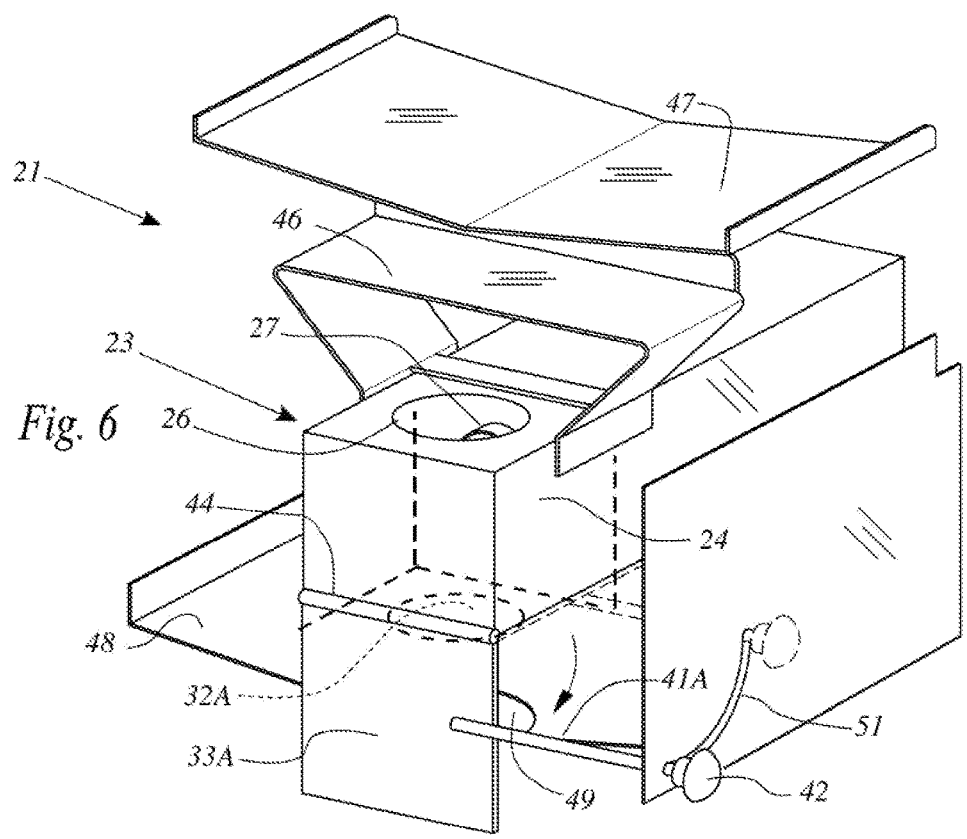
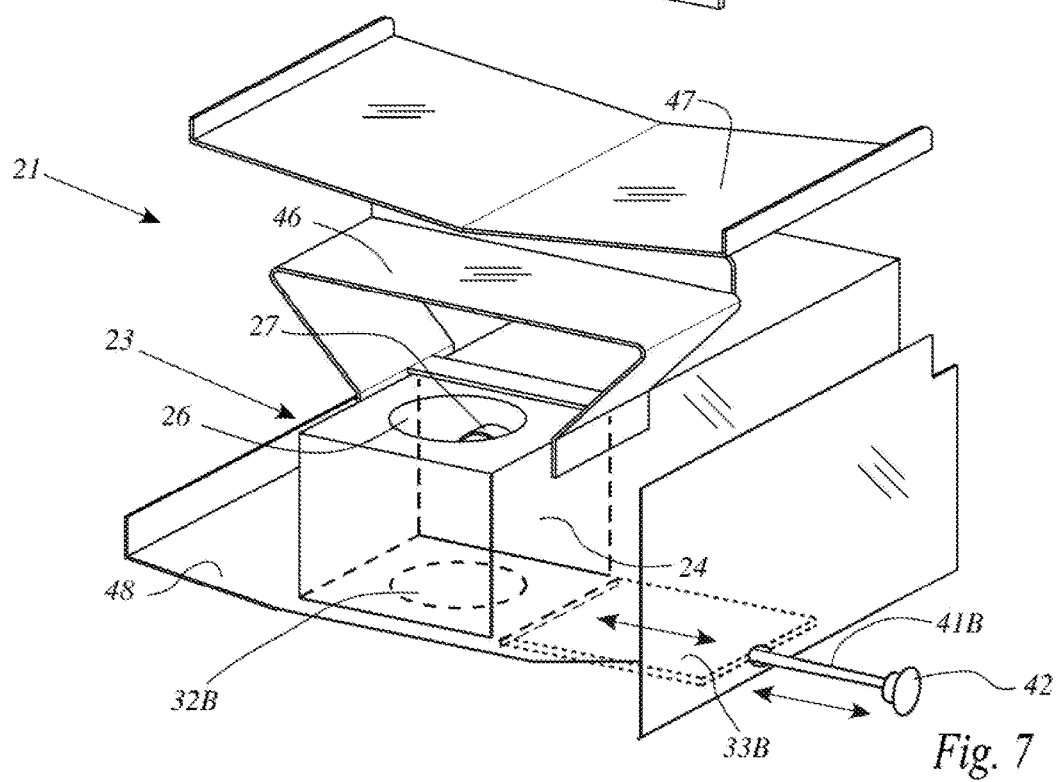

PELLET FUELED GRILL WITH CLEANOUT PORT

CROSS-REFERENCE TO RELATED APPLICATIONS

This application is a continuation of U.S. application Ser. No. 15/491,776, filed Apr. 19, 2017, which is a continuation of U.S. application Ser. No. 14/329,678, filed Jul. 11, 2014, which is a continuation-in-part of U.S. application Ser. No. 13/345,420, filed Jan. 6, 2012, from which filing date priority is claimed.

FEDERALLY SPONSORED RESEARCH

Not applicable.

SEQUENCE LISTING, ETC ON CD

Not applicable.

BACKGROUND

Field of the Invention

This invention relates to barbecue grills and, more particularly, to barbecue grills that are fueled by pelletized wood byproducts.

Description of Related Art

Most barbecue cookers currently in use are fueled by charcoal or charcoal briquettes, or employ gas burners fueled by propane or propane/butane mixtures. However, there are known in the prior art barbecue cookers that employ pelletized wood byproducts as fuel. For example, U.S. Pat. No. 4,823,684 describes a pellet-fired barbecue that is provided with an automatic pellet feeder to sustain the fire and the ongoing cooking task. Starting the fire in the pellet grill is far easier than in a charcoal grill, and the pellet fuel is cheaper than charcoal. Moreover, the amount of fuel consumed is only that which is necessary to complete the cooking task, since the pellet fire extinguishes itself rapidly when the pellet feeder is stopped, whereas charcoal fires tend to burn all the charcoal placed in the grill. And, unlike gas-fired grills, the pellet grill uses wood fuel that produces smoke that flavors the food being cooked on the grill.

However, one of the main problems with existing pellet grills is that the ashes left in the burner after use are difficult to remove. If the accumulated ash is not removed regularly, it may adversely affect the ability to start the pellet burner of the grill. Indeed, the burner should have the ash removed prior to each lighting of the grill.

Prior art pellet-fired grills are not well-constructed to facilitate removal of the ash from the burner unit. Generally, the upper grill components must be disassembled to gain access to the burner. For example, the cooking grates must be removed, an aversive process due to the grease and soot that inevitably coats the grates. Then the heat deflector and flame distributor must be removed to expose the burner unit. The ashes may then be removed, using a vacuum cleaner, and the heat deflector, flame distributor, and cooking grates must be replaced. This is a messy, dirty, and difficult process to undertake every time the grill is used.

BRIEF SUMMARY OF THE INVENTION

The present invention is a cooking grill with a cooking chamber, pellet fuel combustion unit, and ash cleanout system for releasing retained ash from the pellet fuel combustion unit through an access door without requiring the disassembly of the upper components of the grill.

The pellet fuel combustion unit has a first end with a first end opening, and a second end with a second end opening. The ash cleanout system includes an access door adjacent to the second end. The door is operable by a user from a position external to the cooking chamber through a pull link and capable of a first position wherein the second end opening is closed to generally retain ash within the pellet fuel combustion unit. The door is also capable of a second position wherein the second end opening is open to release the retained ash from the pellet fuel combustion unit to a separate removal location.

In alternative embodiments the access door may be hinged to the bottom of the burner assembly adjacent to the cleanout opening, or may be arranged to pivot about a pin or shaft to open or block the cleanout opening.

A further embodiment of the invention provides a stop catch mechanism that prevents unintended or accidental actuation of the pull link.

BRIEF DESCRIPTION OF THE DRAWINGS

FIG. 6 is a cutaway perspective view as in FIG. 2, showing a further embodiment of the access door portion of the invention.

FIG. 7 is a cutaway perspective view as in FIGS. 2 and 5, showing another embodiment of the access door portion of the invention.

DETAILED DESCRIPTION OF THE INVENTION

The present invention generally comprises a pellet-fired grill for barbecue cooking that provides an ash cleanout system in the bottom of the grill to release substantially all ash retained in the combustion unit to a separate removal location by operation of an access door operable from outside the cooking chamber.

Figure 1:
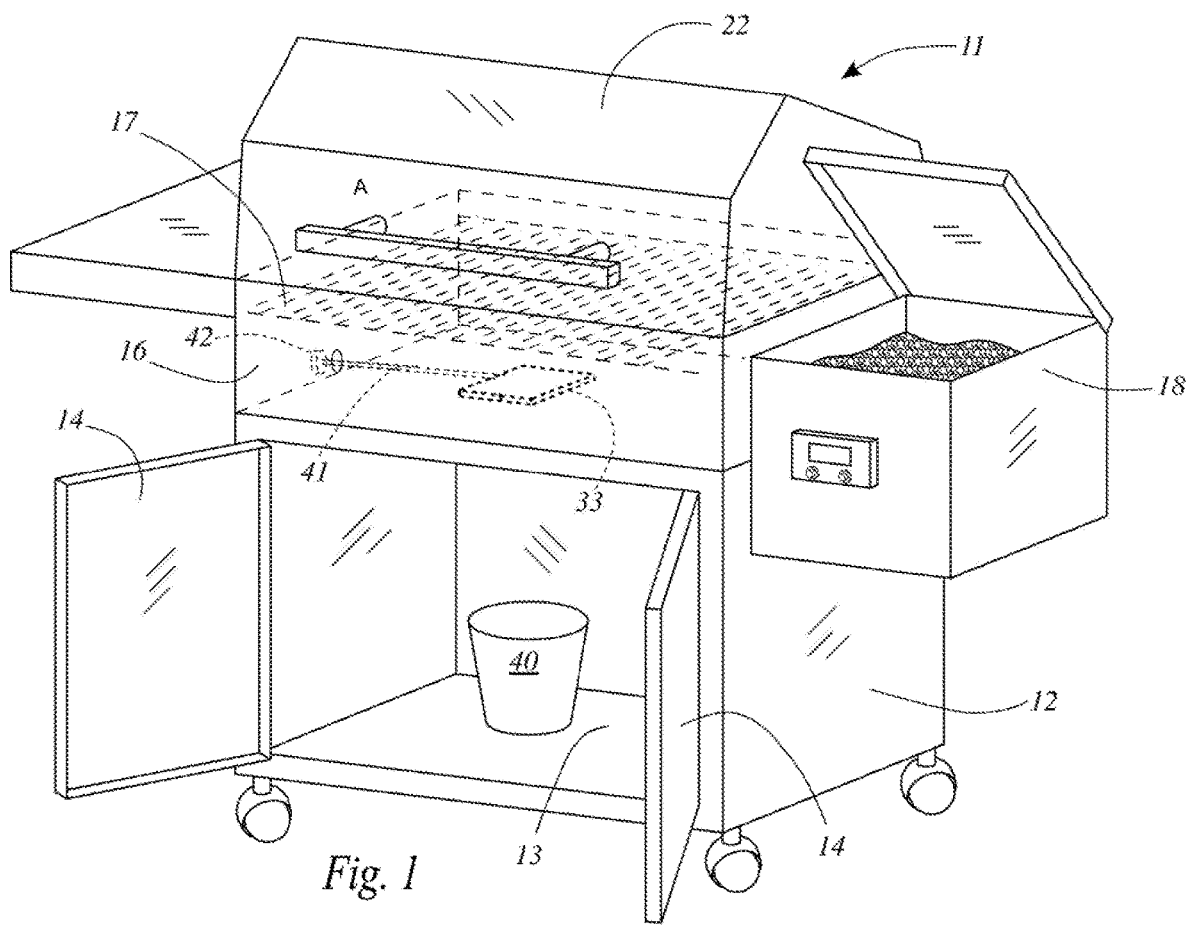
FIG. 1 is a perspective front view of the pellet-fueled grill of the present invention.

With regard to FIG. 1, the pellet-fired grill 11 employs some components known in the prior art and shown here to elucidate the form and functions of the invention. For example, the grill 11 includes a base 12 having a rectangular solid form and including a storage cupboard 13 behind doors 14. A pan section 16 rests atop the base 12 and houses the heat-generating components of the grill. One or more grates 17 are removably secured at the top of the pan section support food items being grilled. A supply bin 18 of pellet fuel is disposed adjacent to the pan section 16, and a pellet transport device such as an auger is disposed between the bin 18 and a pellet burner assembly 21. A grill cover 22 is hinged at one edge to the pan section 16 to and may form a cooking chamber A in connection with grates 17 to enable open grill cooking as well as closed grill roasting.

Figure 2:
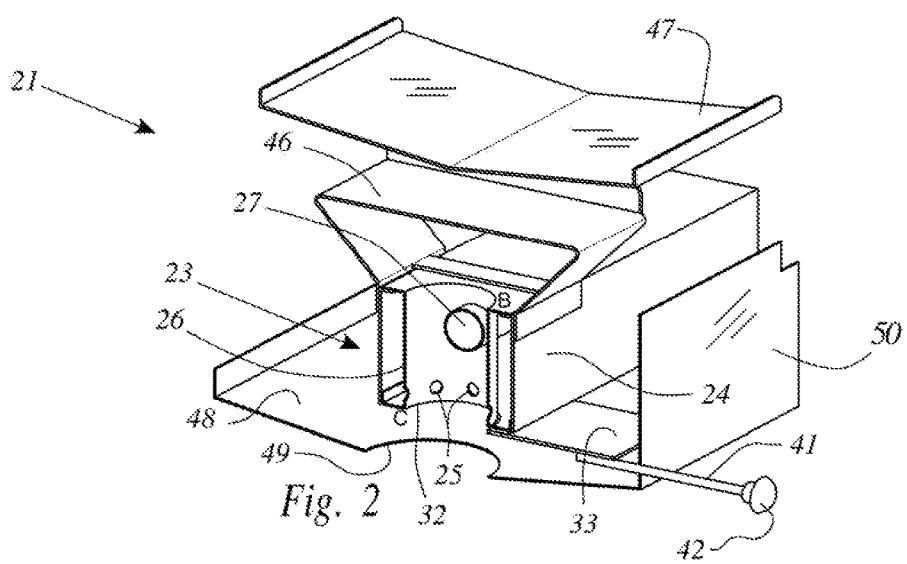
FIG. 2 is a cutaway perspective view of the burner assembly of the grill of FIG. 1, showing the access door portion of the invention.

With reference to FIG. 2, the pellet burner assembly 21 generally includes a combustion chamber 23 secured within a coffer-like housing 24. Supported on the housing 24 is a lower heat deflector 46 and, above that, the upper heat deflector 47. A bottom heat deflector 48 is spaced below the combustion chamber 23 and is provided with a bottom opening 49 extending therethrough. The combustion chamber 23 includes a firebox cup 26 that receives the pellets of fuel delivered by a transport mechanism to an auger tube or chute 27, whereby the pellets to be directed by the chute 27 into the firebox cup 26, where they are burned. Note that combustion air is blown through the housing 24, which feeds air through holes 25 in the firebox cup 26 to burn the pellets therein.

Figure 3:
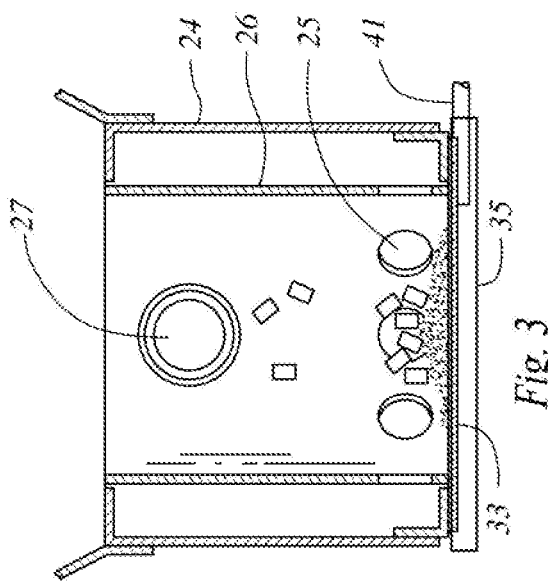
FIG. 3 is a side cross-sectional elevation of the burner assembly of FIG. 2, showing the access door in the closed disposition during combustion.
Figure 4:
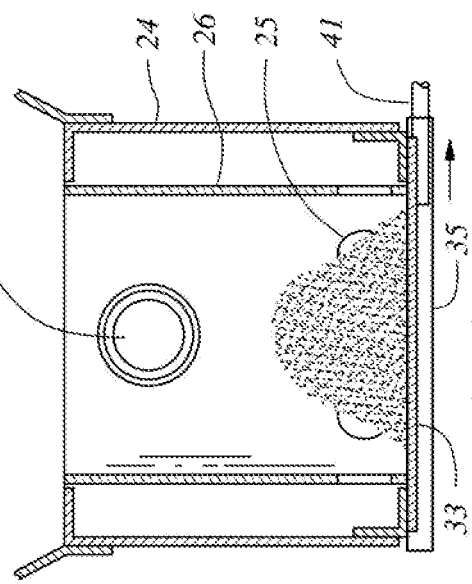
FIG. 4 is a side cross-sectional elevation of the burner assembly of FIGS. 2 and 3, showing the access door in the closed position with ash accumulation after use.

The combustion chamber 23 and/or firebox cup 26 has a first end B with a first end opening, and a second end C with a second end opening 32. In certain embodiments, the firebox cup 26 may be configured to include a substantially continuous side portion. An access door 33 is adjacent to the second end C and configured in sealing fashion, so that pellets of fuel are retained and burned in the firebox cup 26 during operation of the grill, as shown in FIG. 3. Over time the combustion process generates ash that forms in the firebox cup 26 and tends to collect therein, as shown in FIG. 4.

Figure 5:
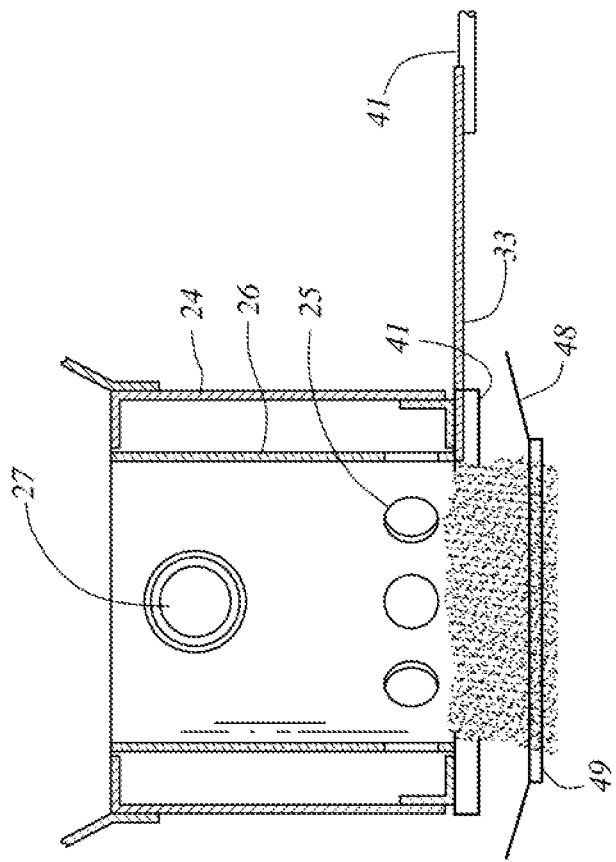
FIG. 5 is a side cross-sectional elevation of the burner assembly of FIGS. 2-4, showing the access door in the open position for removal of accumulated ash.

The access door 33 includes opposed longitudinal sides, and the bottom of the combustion chamber 23 includes supports 35 (FIGS. 3-5) that engage the longitudinal sides and enable the door to translate longitudinally and/or linearly in slidable fashion. The door 33 is dimensioned to span the width of opening 32 so that the opening is entirely occluded and blocked. Note that the opening 32 in the bottom of the combustion chamber 23 is aligned with the opening 49 in the bottom heat deflector 48. Door 33 is capable of a first position wherein the second end opening is closed to generally retain ash within the pellet fuel combustion unit and/or firebox cup (FIGS. 3 & 4) and a second position wherein the second end opening is open to release the retained ash from the pellet fuel combustion unit and/or firebox cup to a separate removal location (FIG. 5).

A pull link 41 is connected to the door 33 and disposed to extend longitudinally. The link 41 protrudes from the front or side or back of the grill assembly—thereby operable by a user from a position external to the cooking chamber—and terminates in a handle or knob 42. The knob 42 enables a user to slide the door in the longitudinal direction out of its blocking position in opening 32 and between first and second positions. When the door 33 is pulled free of the opening 32 the ash that has accumulated in the firebox cup 26 is free to fall through the opening 32 and through the opening 49 in the bottom heat deflector, to be collected in a disposal container such as bucket 40 (FIG. 1).

Notably, in many embodiments the ash cleanout system is configured to release substantially all retained ash from the pellet fuel combustion unit to a separate removal location in a generally unobstructed manner and solely by placement of the access door 33 in the second position—without scraping or other ash collection activity by a user. The door 33 is translated inwardly to reclose the slot opening. This closure preserves the combustion air flow pattern within the combustion chamber. In various embodiments, the opening 32 may also be used to admit a vacuum intake hose from a vacuum cleaning device to positively remove the ash from the combustion chamber 23 and holes 25.

With regard to FIG. 6, there is shown a further embodiment in which the components of the burner assembly 21 are substantially similar to those of FIGS. 2-5 and are accorded the same reference numerals. In this embodiment the access door 33A is secured to the housing 24 by hinge 44, so that the door 33A may pivot open as explained previously to remove accumulated ash, and to pivot closed to block opening 32A. The hinged door 33A is connected to a link 41A which extends longitudinally through the front panel of the grill and through an arcuate slot 51 as shown in FIG. 6. A user may push the link 41A to translate along the slot 51 to rotate the door 33A between the open and closed positions, so that the combustion chamber may be cleared of ash when needed, and then closed for further operation.

With reference to FIG. 7, there is shown a more detailed view of the components of the burner assembly 21 of FIGS. 2-5 and are accorded the same reference numerals. In this embodiment the access door 33B is secured to the bottom panel of housing 24 by supports that enable the access door to translate from the open to the closed position. As before, the door 33B is connected to a pull link 41B as shown in FIG. 7 to enable translation of the door 33B along the axis of the link 41B to accomplish opening and closing of the access door as explained in the foregoing.

It should be noted that the description of the use of the access door 33-33B does not mention nor require any task involving disassembly of the upper grill components in the pan section 16, such as the grate(s) 17, flame spreader, or heat deflector. Thus the access door alleviates a great amount of messy, aversive work required to clean ash out of prior art pellet-fired grills.

With regard to FIGS. 2 and 8-10, a further aspect of the invention comprises a stop catch mechanism 51 that is secured to a sidewall 50 of the grill superjacent to the point where the pull link 41 (or 41B) protrudes from the sidewall 50, which may be at the front or side or rear of the assembly. It has been noted that opening the door 33 during operation of the grill may be dangerous, particularly since the combustion chamber contains the positive pressure of the blower as well as hot embers and ash debris at the bottom thereof. If the handle 42 is pulled accidentally, as by a passerby, an inexperienced grill operator, or malicious mischief, directed air supply to the combustion chamber may cause the ash and embers to be blown all over the nearby area and the persons occupying it.

The stop catch mechanism 51 includes a plate 52 extending parallel to the sidewall 50 of pan section 16, and a finger tab 53 extending outwardly and generally orthogonally from the plate 52 at the upper edge thereof. A pair of screw slots 54 extend generally vertically and parallel at opposed ends of the plate 52, and screws 56 extend through the slots 54 and are anchored in the sidewall 50, enabling the mechanism 51 to slide vertically through a limited excursion. Extending outwardly from a central portion of the lower edge of the plate 52 is an arched projection 57 having a central clevis opening 58. As shown best in FIG. 10, the clevis opening 58 is a downwardly opening slot having opposed side edges joined by a smoothly curved interior edge.

Figure 8:
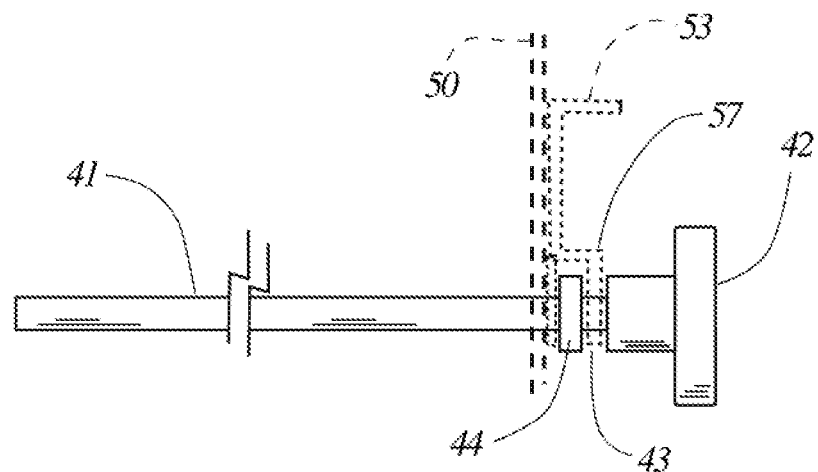
FIG. 8 is a plan view of a further embodiment of the pull link assembly of the invention.
Figure 9:
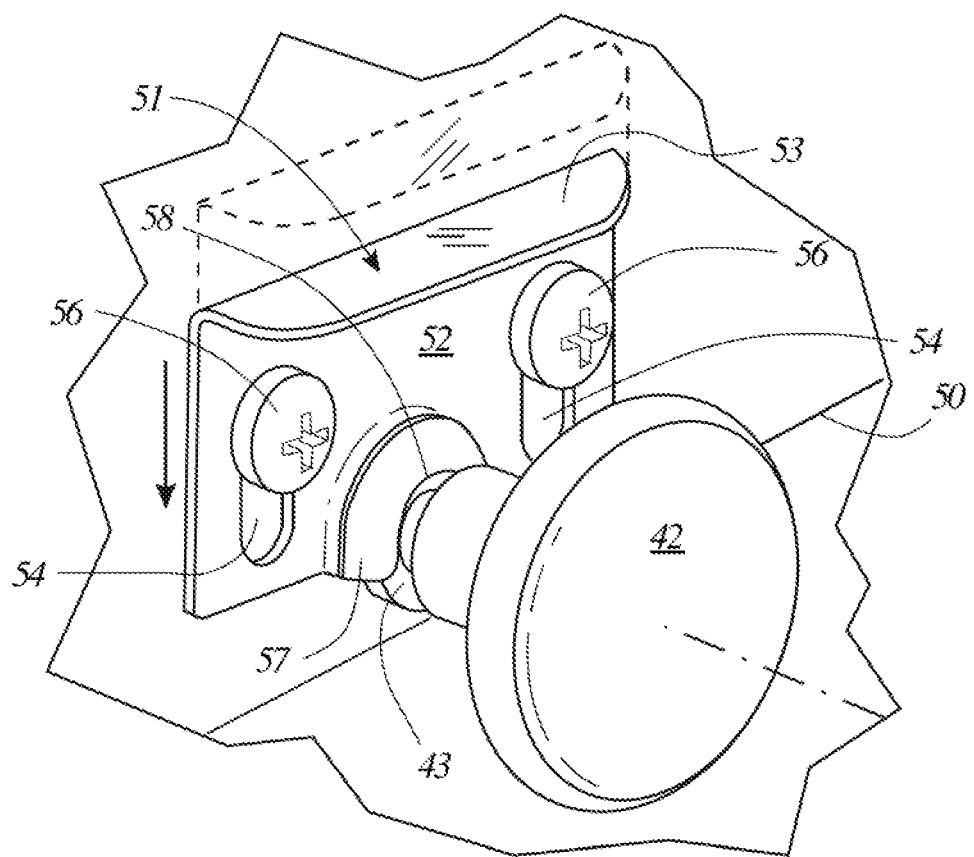
FIGS. 9 and 10 are enlarged perspective views showing the stop catch mechanism of the invention in the latched and unlatched dispositions, respectively.
Figure 10:
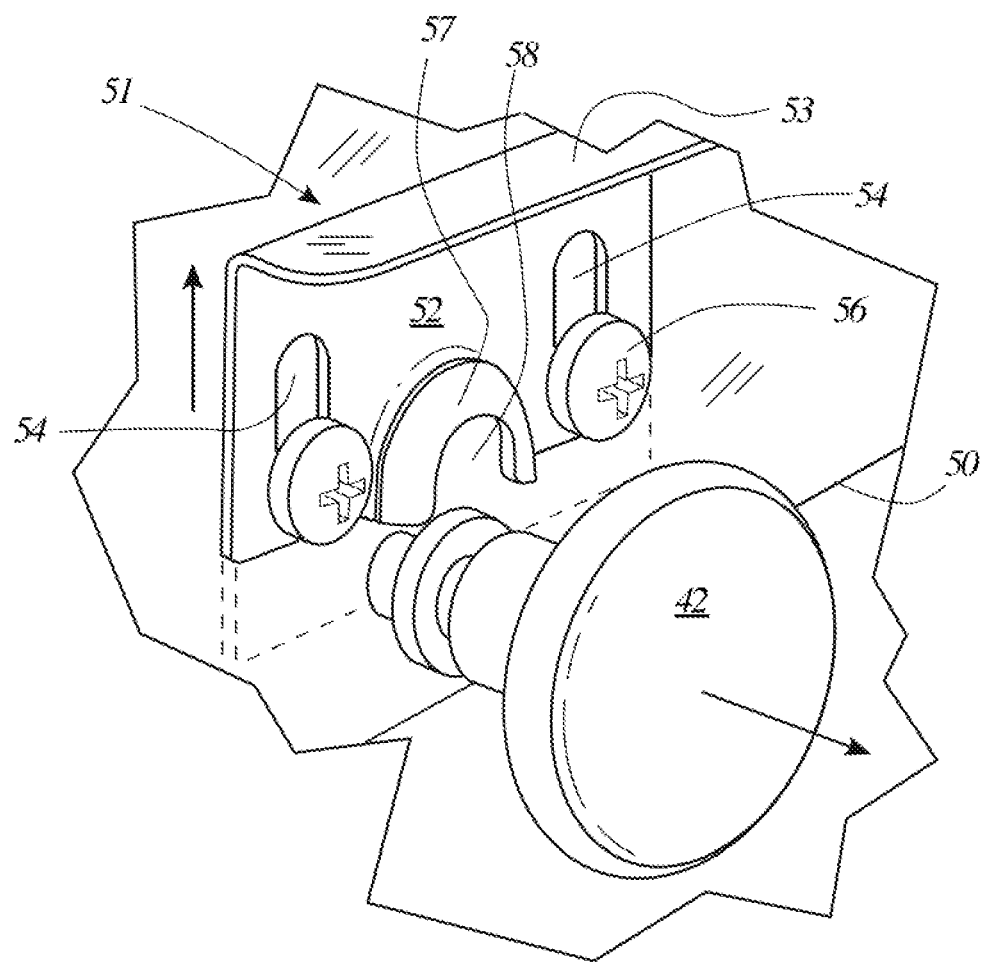

With particular reference to FIG. 8, the pull link 41 described previously is modified with the addition of an annular detent recess 43 disposed adjacent to the stem end of pull knob 42. The detent recess 43 may be defined by a bushing 44 assembled to the pull rod 41 adjacent to the stem end of the knob, or the recess 43 may comprise an annular groove that is milled, turned, molded, printed, or otherwise formed by well-known manufacturing processes. The annular detent recess is dimensioned and disposed to be engageable by the clevis opening 58 of stop catch mechanism 51. As shown in FIG. 9, the stop catch mechanism is typically disposed in a downward position with the clevis opening 58 engaged with the detent recess 43 in complementary fashion, thus preventing the knob 42 from being pulled outwardly to open the access door 33. Thus accidental opening of the combustion chamber while in use is prevented.

To open the access door 33 when the grill is turned off and cool, the user must first slide the mechanism 51 upwardly by engaging the finger tab 53, thus releasing the clevis opening 58 from the detent recess 43. The user may then easily pull the knob 42 to dump the accumulated ash from the combustion chamber, as described previously. After the ash disposal process, the finger tab 53 may be used to push the mechanism 51 downwardly to re-engage the detent recess 43 and establish the detented position as an ongoing safety precaution.

It is noted that the mechanism 51 may be applied to all the embodiments described above, such as those of FIGS. 6 and 7 without departing from the spirit and teachings of this invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A cooking grill comprising:
    a cooking chamber;
    a pellet fuel combustion unit having a first end with a first end opening, and a second end with a second end opening;
    an ash cleanout system comprising an access door formed in a bottom panel of the combustion unit, the access door being configured to transition from a first position in which the second end opening is entirely closed to retain ash within the pellet fuel combustion unit and a second position in which the second end opening is open to release the retained ash from the pellet fuel combustion unit to a separate removal location.

2. The cooking grill of claim 1, the ash cleanout system further configured to release substantially all retained ash from the pellet fuel combustion unit to the separate removal location solely by placement of the access door in the second position.

3. The cooking grill of claim 1, the ash cleanout system further configured to release ash to the separate removal location in a generally unobstructed manner when the access door is in the second position.

4. The cooking grill of claim 1, whereby the access door is operable to move between the first and second positions in a linear fashion.

5. The cooking grill of claim 1, further comprising a pull link assembly for moving the access door between the first and second positions.

6. The cooking grill of claim 5, wherein the pull link assembly for moving the access door between first and second positions is operable by a user from a position external to the cooking chamber.

7. A pellet fueled cooking grill comprising:
    a cooking chamber;
    a pellet fuel combustion unit with a firebox cup having a first end with a first end opening, a second end with a second end opening, and a substantially continuous side portion; and
    an ash cleanout system comprising an access door adjacent to the firebox cup second end, the access door capable of a first position wherein the second end opening is closed to generally retain ash within the firebox cup, the access door further capable of a second position wherein the second end opening is open to release the retained ash from the firebox cup to a separate removal location.

8. The cooking grill of claim 7, the ash cleanout system further configured to release substantially all of the retained ash from the firebox cup to a separate removal location solely by placement of the access door in the second position.

9. The cooking grill of claim 7, the ash cleanout system further configured to release ash to the separate removal location in a generally unobstructed manner when the access door is in the second position.

10. The cooking grill of claim 7, whereby the access door is operable to move between the first and second positions in a linear fashion.

11. The cooking grill of claim 7, further comprising a pull link assembly for moving the access door between the first and second positions.

12. The cooking grill of claim 11, wherein the pull link assembly for moving the access door between the first and second positions is operable by a user from a position external to the cooking chamber.

13. A wood pellet fueled cooking grill comprising
    a cooking chamber;
    a pellet fuel combustion unit with a firebox cup having a first end with a first end opening, a second end with a second end opening, and a substantially continuous side portion;
    an ash cleanout system comprising an access door adjacent to the firebox cup second end, the access door capable of a first position wherein the second end opening is closed to generally retain ash within the firebox cup, the access door further capable of a second position wherein the second end opening is open to release the retained ash from the firebox cup to a separate removal location;
    the ash cleanout system further configured to allow a user to remove substantially all retained ash from the pellet fuel combustion unit to the separate removal location solely by placement of the access door in the second position.

14. The cooking grill of claim 13, the ash cleanout system further configured to release ash to the separate removal location in a generally unobstructed manner when the access door is in the second position.

15. The cooking grill of claim 13, whereby the access door is operable to move between the first and second positions in a linear fashion.

16. The cooking grill of claim 13, further comprising a pull link assembly for moving the access door between the first and second positions.

17. The cooking grill of claim 16, wherein the pull link assembly for moving the access door between first and second positions is operable by a user from a position external to the cooking chamber.

\* \* \* \* \*